June 11, 1968  H. R. KARLEN  3,387,903
LIQUID HEATER
Filed April 4, 1967  2 Sheets-Sheet 1
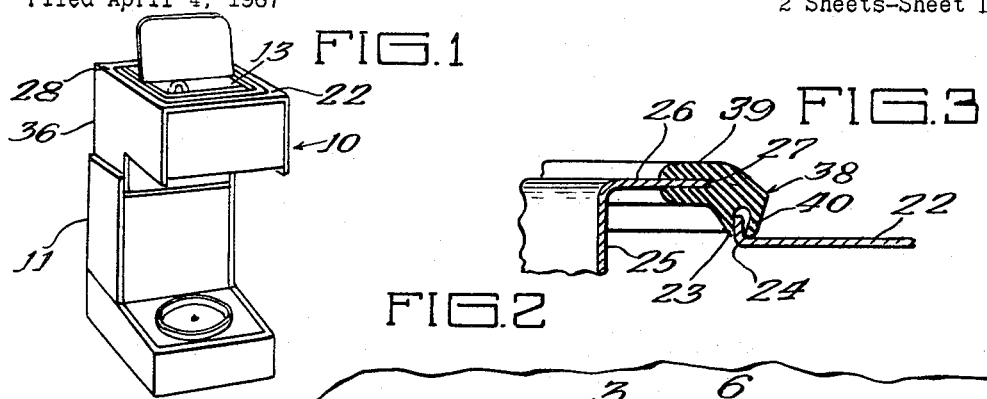
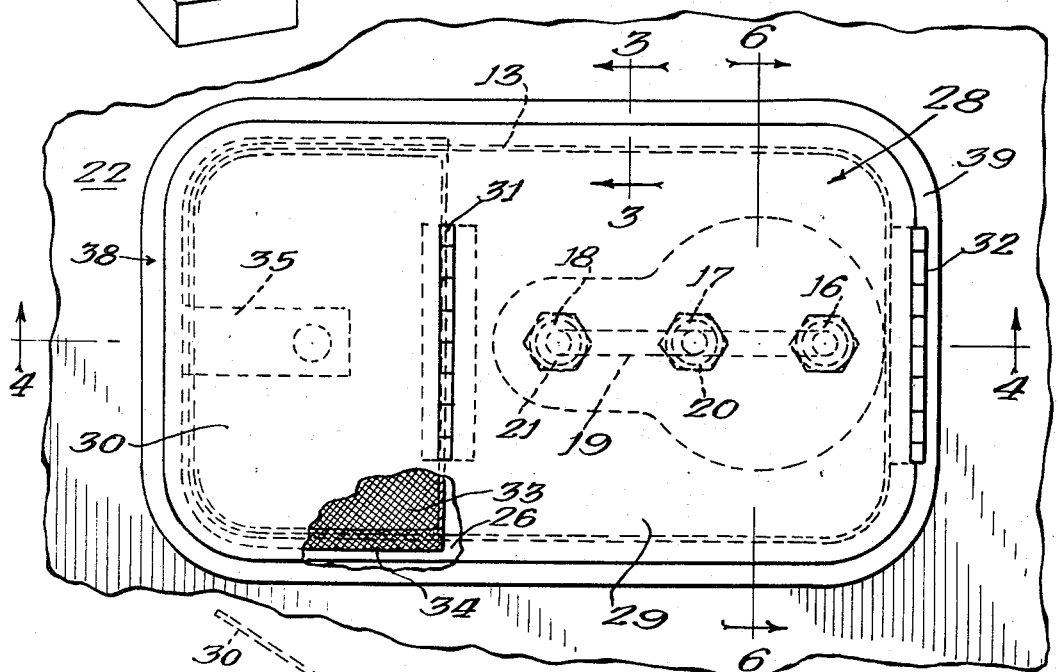
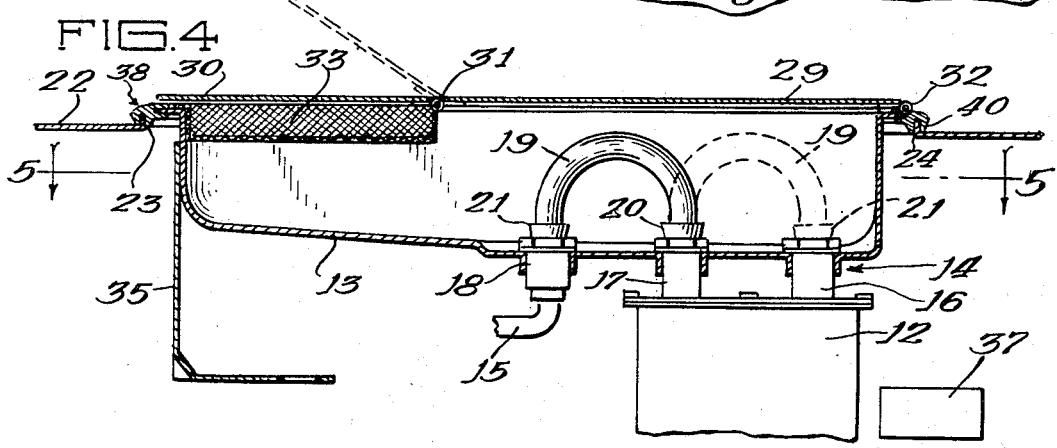
Inventor:
Harvey R. Karlen
By: Hofgren, Wegner, Allen,
Stellman & McCord
Attorneys United States Patent Office 3,387,903
Patented June 11, 1968

3,387,903
LIQUID HEATER
Harvey R. Karlen, Chicago, Ill., assignor to Cory
Corporation, a corporation of Delaware
Filed Apr. 4, 1967, Ser. No. 628,337
12 Claims. (Cl. 312—228)

ABSTRACT OF THE DISCLOSURE

A liquid heater of the pour-through type wherein water is poured into a basin to effect a delivery of hot water such as to an associated brewing device. The basin is disposed within a housing of the apparatus and includes an upper portion projecting upwardly through the housing for facilitated pouring of water thereinto. Removable means are provided for joining the upper end of the basin to the top of the housing. The basin is provided further with a hinged cover for selectively closing the same.

---

This invention relates to liquid heaters and in particular to heaters of the pour-through type having a basin for receiving poured water to effect the delivery of hot water from the apparatus.

In one conventional form of liquid heater, the liquid, such as water, is heated in a tank having an outlet communicating with the upper end of the tank and an inlet for delivering water into the tank to displace a corresponding quantity of hot water outwardly through the outlet. The incoming water is delivered to the tank from a basin into which the water is poured as from a decanter or the like. Conventionally, electrical controls are associated with the apparatus for controlling the heating and may include thermostatic control means for maintaining the water in the tank at a preselected brewing temperature, such as approximately 200° F. The apparatus is conventionally provided with an outer housing which may enclose the tank, basin and associated controls. The present invention is directed to such a structural combination wherein the basin is arranged to project upwardly through the upper wall of the housing for facilitated reception of the poured water and manipulation of flow control means associated with the basin as will be brought out more fully hereinafter.

Thus, a principal feature of the present invention is the provision of a new and improved liquid heater.

Another feature of the invention is the provision of such a liquid heater having a new and improved construction wherein a basin is disposed to project upwardly through the top wall of an associated housing of the apparatus.

A further feature of the invention is the provision of such a liquid heater including new and improved means for joining the basin to the housing.

Still another feature of the invention is the provision of such a liquid heater including a tank, means for heating liquid in the tank, a basin above the tank for receiving poured liquid, means for delivering the poured liquid from the basin into the tank, a cabinet for housing the tank and basin, means on the housing defining a top wall having an opening therethrough, means on the basin defining an upper edge portion projecting upwardly through the opening to substantially above the top wall, the upper edge portion being arranged to be passable through the opening, and means extending removably between the housing top wall and the basin edge portion for precluding fluid flow through the opening outwardly of the edge portion.

A further feature of the invention is the provision of such a liquid heater wherein the flow precluding means comprises means for effectively sealing the housing top wall to the basin edge portion to preclude liquid flow downwardly through the opening outwardly of the edge portion.

Still another feature of the invention is the provision of such a liquid heater wherein the basin is provided with a lid for selectively closing the same.

Yet another feature of the invention is the provision of such a liquid heater wherein the lid is adapted to seat on the flow precluding means.

A further feature of the invention is the provision of such a liquid heater including new and improved means for screening foreign matter from the water being poured into the basin.

Still another feature of the invention is the provision of such a liquid heater wherein the flow precluding means is arranged to effectively limit heat loss from the tank by precluding convective flow of air upwardly between the basin and housing top wall.

Another feature of the invention is the provision of of such a liquid heater wherein the flow precluding means is formed of a material adapted to preclude noise in the closing of the lid on the basin.

A further feature of the invention is the provision of such a liquid heated wherein the flow precluding means effectively seals the basin to the housing top wall.

A yet further feature of the invention is the provision of such a liquid heater having new and improved lid construction permitting facilitated access selectively to a portion or the entirety of the basin.

Another feature of the invention is the provision of such a liquid heater wherein the top edge portion of the basin defines an outturned distal flange and the opening in the housing top wall through which the basin extends is defined by an upstanding distal flange.

Still another feature of the invention is the provision of such a liquid heater wherein means are provided for removably associating the housing with the basin to permit relative movement of the basin downwardly through the opening subsequent to removal of the flow precluding means.

Another feature of the invention is the provision of such a liquid heater wherein the flow precluding means comprises a gasket formed of resilient material and having a first portion removably fitted to the basin edge portion and a second portion removably fitted to the opening defining means of the housing.

Other features and advantages of the invention will be apparent from the following description taken in connection with the accompanying drawings wherein:

FIGURE 1 is a perspective view of a liquid heater embodying the invention;

FIGURE 2 is a fragmentary enlarged plan view thereof;

FIGURE 3 is a fragmentary further enlarged vertical section taken substantially along the line 3—3 of FIGURE 2;

FIGURE 4 is a fragmentary vertical section taken substantially along the line 4—4 of FIGURE 2;

Figure 5:
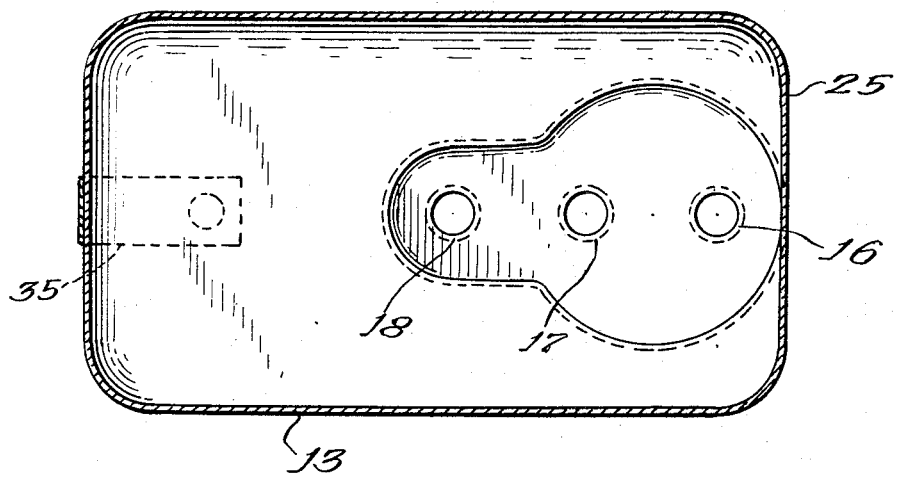
FIGURE 5 is a horizontal section taken substantially along the line 5—5 of FIGURE 4.

In the exemplary embodiment of the invention as disclosed in the drawing, a liquid heater generally designated 10 is shown to comprise a housing 11 enclosing a tank 12 in which a liquid, such as water, may be heated for use such as in associated brewing apparatus (not shown). The apparatus includes a basin 13 into which water is poured for delivery through a conduit means 14 selectively into the tank 12 or directly to an outlet 15. The conduit means 14 is selectively disposed to conduct hot water from the tank 12 when cold water is poured into the basin 13 and thence into the tank 12, or to close the tank 12 and permit hot water poured into the basin 13 to flow directly to the outlet 15.

More specifically, the conduit means 14 includes an inlet duct 16 extending downwardly from the basin 13 into the tank 12, an outlet duct 17 extending upwardly from the tank 12 to the basin 13, and an outlet duct 18 extending downwardly from the basin 13 to the outlet 15. Control of the delivery selectively to the tank 12 or directly to the outlet is provided by a U-shaped siphon tube 19 having a first connecting means 20 at one end and a second connecting means 21 at the opposite end. As shown in full lines in FIGURE 4, the tube 19 may be arranged with connecting means 20 sealingly connected to duct 17 and connecting means 21 sealing connected to duct 18 where it is desired to conduct cold water from the basin 13 into the tank 12 to displace hot water from the tank through the tube 19 to the outlet 15. When it is desired to conduct hot water directly to basin 13 to the outlet 15, the tube 19 is arranged with the connecting means 21 sealingly connected to the duct 16, thereby closing the tank 12 and permitting duct 18 to communicate directly with the basin for conducting the hot water directly from the basin to the outlet 15.

For facilitated pouring of the water into basin 13 and for facilitated manipulation of the siphon tube 19 for such selective disposition, the basin 13 herein is caused to extend to upwardly of the top wall 22 of the housing 11 through an opening 23 therein defined by an upstanding flange 24. The basin includes a peripheral side wall 25 having an outturned distal flange 26 which as shown in FIGURE 3 is disposed at a level slightly above the level of the top wall 22. The periphery 27 of the flange 26 is slightly smaller than the internal dimension of the flange 23 so as to provide a clearance therebetween. As shown in FIGURE 1, the basin is provided with a lid 28 for selectively closing the basin. More specifically, the lid includes a rear portion 29 and a front portion 30 hingedly connected by a suitable hinge 31 permitting the front portion 30 to be swung to an open position as shown in FIGURE 1 to provide access to the forward portion of the basin 13. The rear portion 29 of the lid is hingedly connected to the basin flange 26 by a hinge 32 to permit the entire lid to be swung away from the closed position across the basin, thereby to provide access to the entire basin such as for manipulating the siphon tube 19 as discussed above. A screen 33 is removably disposed across the forward portion of the basin subjacent the lid portion 30 for screening foreign material from the water being poured into the basin, and as shown in FIGURES 2 and 3, may be provided with a peripheral flange portion 34 adapted to rest on the flange 26 of the basin for supporting the screen thereon.

The basin 13 is supported in the position wherein it projects upwardly through the top wall opening 23 by the ducts 16 and 17 as well as by a forward bracket 35. The upper portion 36 of the housing 11 is separable by an upward movement thereof to permit exposure of the tank 12 and associated electrical controls 37 (schematically illustrated in FIGURE 4) such as for servicing the same while permitting the basin to remain rigidly associated with the tank. This upward movement of the housing portion 36 is permitted by the clearance between the periphery 27 of the basin flange 26 and the flange 24 of the top wall defining opening 23, whereby the basin may effectively have relative downward movement through the opening 23.

The apparatus 10 further includes means for precluding fluid flow through the opening 23 outwardly of the periphery 27 of the basin flange, and herein said flow precluding means comprises a gasket member 38 extending from the basin flange 26 to the top wall flange 24, as best seen in FIGURE 3. Thus, member 38 defines means for preventing fluid such as water from falling downwardly through the opening 23 past the basin edge 27 which may produce undesirable effects, such as shorting of the electrical circuitry of control 37. Further, member 38 defines means for sealingly closing the space between flange 26 and flange 24 to preclude heat loss upwardly therethrough such as by convective air flow from the relatively hot tank 12. To this end, member 38 comprises an elongated member formed of a material such as neoprene rubber having a first inturned slotted portion 39 receiving the peripheral portion 27 of the flange 26 and a second downturned slotted portion 40 receiving the upstanding flange 24 of the housing top wall 22. The respective flanges sealingly engage the member 38 within the slotted portions to provide the above discussed sealing connection between the basin and housing top wall.

Figure 6:
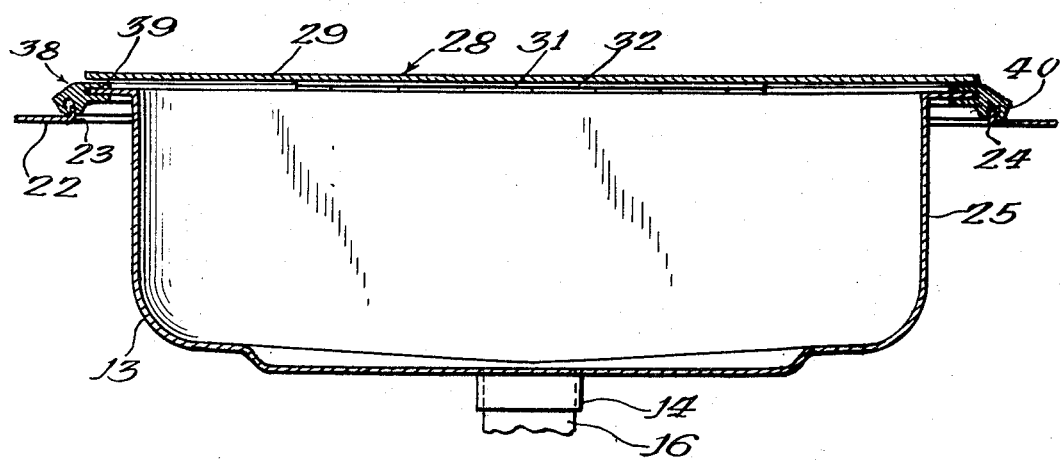
FIGURE 6 is an enlarged vertical section taken substantially along the line 6—6 of FIGURE 2.
Figure 7:
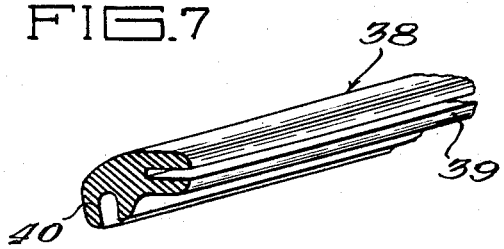
FIGURE 7 is an isometric view of a portion of the flow precluding means.

As shown in FIGURE 6, the inturned portion 39 further defines a resilient element overlying the basin flange portion 27 for resiliently supporting and effectively sealing the lid 28 in the closed position across the basin 13. Further, by virtue of the resilient characteristics of the member 38, the member defines a means for precluding noise in placing the lid in the closed position across the basin.

Still further, the flange portion 34 of the screen 33 may extend into the slotted portion 39 of the member 38 to be effectively retained thereby in association with the basin 13 while yet permitting facilitated removal of the screen as for periodic maintenance thereof. The screen may be relatively thin for facilitated installation in the slotted portion 39 with the basin flange portion 27 and, illustratively, may be formed of 80–100 mesh stainless steel screening.

The resilient nature of the member 38 further permits facilitated mounting of the lid 28 on the basin by eliminating the need for extreme accuracy in mounting the hinges 32 and 31 as some variation in the coplanar relationship of the lid portions 29 and 30 in the closed position may be accommodated by the yieldability of the member 38. The member 38 may be formed inexpensively as by extrusion and may comprise a one piece length thereof suitably installed by pressing the slotted portions onto the corresponding flanges about the opening 23.

Thus, the user is afforded improved accessibility to the basin 13 by the facilitated manipulation of the lid portion 30 while yet complete access to the basin 13 as for selective arrangement of the siphon tube 19 may also be readily effected by swinging the entire lid upwardly therefrom. The member 38 effectively removably joins the basin to the housing, and effectively precludes inadvertent passage of water downwardly through the top wall opening, heat loss as by convection upwardly through the opening, noise in the manipulation of the lid in closing the basin, the need for highly accurate arrangement of the hinged connections of the lid means, and the need for providing separate means for removably holding the screen 33 in place. The member 38 is extremely simple and economical of construction, and may be readily installed and removed from the apparatus 10 for facilitated servicing thereof. The use of the member 38 permits the highly desirable extension of the basin 13 upwardly through the housing opening for facilitated access.

While I have shown and described one embodiment of my invention, it is to be understood that it is capable of many modifications. Changes, therefore, in the construction and arrangement may be made without departing from the spirit and scope of the invention as defined in the appended claims.

I claim:

1. In a liquid heater having a tank, means for heating liquid in the tank, a basin above the tank for receiving poured liquid, means for delivering the poured liquid from the basin into the tank, and a cabinet for housing the tank and basin, structure comprising:

means on the housing defining a top wall having an opening therethrough;

means on the basin defining an upper edge portion projecting upwardly through said opening to substantially above said top wall, said upper edge portion being arranged to be passable through said opening; and means extending removably between said housing top wall and said basin edge portion for precluding fluid flow through said opening outwardly of said edge portion.

2. The liquid heater structure of claim 1 wherein said last named means comprises means for effectively sealing said housing top wall to said basin edge portion to preclude liquid flow downwardly through said opening outwardly of said edge portion.

3. The liquid heater structure of claim 1 further including a lid for selectively closing said basin and said last named means defines a seat on said upper edge portion for sealingly supporting said lid across the top of said basin.

4. The liquid heater structure of claim 1 further including foraminous means for screening fluid poured therethrough and said last named means comprises means for retaining said foraminous means in place across the top of said basin.

5. The liquid heater structure of claim 1 wherein said last named means comprises means for effectively sealing said housing top wall to said basin edge portion to preclude convective flow of air upwardly from said tank through said opening outwardly of said edge portion.

6. The liquid heater structure of claim 1 further including a lid for selectively closing said basin and wherein said last named means comprises a resilient cover on said basin edge portion for precluding noise in closing said lid across the top of said basin by precluding contact of said lid with said upper edge portion.

7. The liquid heater structure of claim 1 further including a lid for selectively closing said basin and means for hinging said lid at one end thereof to said basin edge portion to seat selectively on said means for precluding fluid flow thereby to close said basin, said means for precluding fluid flow comprising a resilient element providing facilitated sealing of said lid thereto.

8. The liquid heater structure of claim 1 further including an articulated lid having a first portion hingedly connected to said basin and a second portion hingedly connected to said first portion selectively permitting access to a portion of said basin for pouring liquid thereinto while maintaining the remainder of the basin covered and permitting access to the entire basin.

9. The liquid heater structure of claim 1 wherein said basin edge portion includes an outturned distal flange.

10. The liquid heater structure of claim 1 wherein said opening means on said housing includes an upstanding distal flange.

11. The liquid heater structure of claim 1 including means for removably associating said housing with said basin whereby said housing may be moved upwardly beyond said basin edge portion by relative movement of said edge portion downwardly through said opening subsequent to removal of said fluid flow precluding means.

12. The liquid heater structure of claim 1 wherein said last named means comprises a gasket formed of resilient material and having a first portion removably fitted to said basin edge portion and a second portion removably fitted to said opening defining means of said housing.

References Cited
UNITED STATES PATENTS

| | | | |
|---|---|---|---|
| 2,617,481 | 11/1952 | Frohnapel | 220—30 X |
| 3,231,903 | 2/1966 | Cope | 312—228 X |
| 3,253,874 | 5/1966 | Czech | 312—228 X |

CASMIR A. NUNBERG, *Primary Examiner.*